United States Patent [19]

Takashima

[11] Patent Number: 5,150,102
[45] Date of Patent: Sep. 22, 1992

[54] MACHINING FLUID TEMPERATURE DEVIATION ALARM

[75] Inventor: Hidenori Takashima, Kamakura, Japan

[73] Assignee: Fanuc Ltd, Minamitsuru, Japan

[21] Appl. No.: 499,441

[22] PCT Filed: Oct. 19, 1989

[86] PCT No.: PCT/JP89/01074
§ 371 Date: Jun. 22, 1990
§ 102(e) Date: Jun. 22, 1990

[87] PCT Pub. No.: WO90/04479
PCT Pub. Date: May 3, 1990

[30] Foreign Application Priority Data

Oct. 27, 1988 [JP] Japan .................... 63-269538

[51] Int. Cl.⁵ .................................... G08B 17/06
[52] U.S. Cl. .................................... 340/584; 137/551; 137/334; 165/11.1; 165/14; 340/593; 340/596; 340/679; 340/680
[58] Field of Search ............... 340/584, 596, 680, 679, 340/593; 137/334, 551; 165/11.1, 14; 75/10.12, 10.1

[56] References Cited

U.S. PATENT DOCUMENTS 3,927,571 12/1975 Athey .................... 340/595

Primary Examiner—Glen R. Swann, III
Attorney, Agent, or Firm—Staas & Halsey

[57] ABSTRACT

A machining fluid temperature deviation alarm device is attached to an electrical discharge machining device which, having a temperature sensor (S1) for machining fluid temperature detection and a cooler (2) for machining fluid cooling, controls the cooler in response to a temperature sensor output signal, thereby controlling the machining fluid temperature within an allowable range. The alarm device employs a second temperature sensor (S2) for determining whether the machining fluid temperature is within a predetermined temperature range set by means of a second setter (5) and encompassing the allowable machining fluid temperature range. In response to an output signal from the second temperature sensor, indicative of a deviation of the machining fluid temperature from the predetermined temperature range, a numerical control device (3) causes a CRT display unit (6) to display a temperature deviation message, and stops the operation of the electrical discharge machining device, thereby preventing lowering of machining accuracy, fluctuation of machining speed, and unstable electrical discharge machining that are attributable to the deviation of the machining fluid temperature.

3 Claims, 1 Drawing Sheet

MACHINING FLUID TEMPERATURE DEVIATION ALARM

TECHNICAL FIELD

The present invention relates to an alarm device attached to an electrical discharge machine, and more particularly, to an alarm device adapted automatically to give an alarm when the temperature of a machining fluid deviates from a predetermined temperature range during electrical discharge machining.

BACKGROUND ART

If the temperature of a machining fluid fluctuates during electrical discharge machining, the specific resistance of the machining fluid and hence, the machining speed, fluctuate, and also, the dimensions of a workpiece vary. As a result, the stability of the electrical discharge machining is ruined, and the machining accuracy is lowered. Conventionally, therefore, when the machining fluid temperature detected by means of a temperature sensor, such as a thermostat, exceeds an allowable upper limit value, the operation of a cooler for cooling the machining fluid is started. When the machining fluid temperature is lower than an allowable lower limit value, the operation of the cooler is stopped. Thus, the machining fluid temperature is controlled within a predetermined range of temperature.

Even in an electrical discharge machine provided with such a machining fluid temperature control system, however, if the cooler or the temperature sensor goes wrong, or if the electrical discharge machining is executed without connecting the cooler to the power supply, for example, the machining fluid temperature deviates from the predetermined temperature range, so that the aforementioned awkward situation is entailed. Namely, the stability of the electrical discharge machining is ruined if the machining fluid temperature rises too high, or the machining fluid is frozen if it is excessively cooled, for example.

DISCLOSURE OF THE INVENTION

The object of the present invention is to provide a machining fluid temperature deviation alarm device used in an electrical discharge machine and adapted automatically to give an alarm when the machining fluid temperature deviates from a predetermined temperature range during electrical discharge machining.

In order to achieve the above object, according to the present invention, there is provided a machining fluid temperature deviation alarm device attached to an electrical discharge machine, in which a machining fluid temperature adjuster is controlled so that a detected machining fluid temperature is within an allowable temperature range, in response to an output signal of a temperature sensor indicative of whether the machining fluid temperature is within said allowable temperature range.

This alarm device comprises a setter for setting a predetermined temperature range covering the allowable temperature range, a second temperature sensor provided independently of the temperature sensor, and alarm means. The second temperature sensor detects the machining fluid temperature, determines whether the detected machining fluid temperature is within the predetermined temperature range, and delivers a signal indicative of the result of the determination. The alarm means gives an alarm in response to the output signal of the second temperature sensor, indicative of a deviation of the detected machining fluid temperature from the predetermined temperature range.

Preferably, the machining fluid temperature deviation alarm device includes halt means for stopping the operation of the electrical discharge machine in response to the output signal of the second temperature sensor, indicative of the deviation of the detected machining fluid temperature from the predetermined temperature range.

According to the present invention, as described above, the alarm is given when the machining fluid temperature deviates from the predetermined temperature range which covers the allowable temperature range, due to some trouble in the machining fluid temperature sensor or the machining fluid temperature adjuster, or a failure to connect the temperature adjuster to the power supply, and preferably, the operation of the electrical discharge machine is stopped when the alarm is given. Thus, lowering of machining accuracy, fluctuation of machining speed, and unstable electrical discharge machining, which are attributable to the offstate of the machining fluid temperature, can be prevented.

BEST MODE OF CARRYING OUT THE INVENTION

Figure 1:
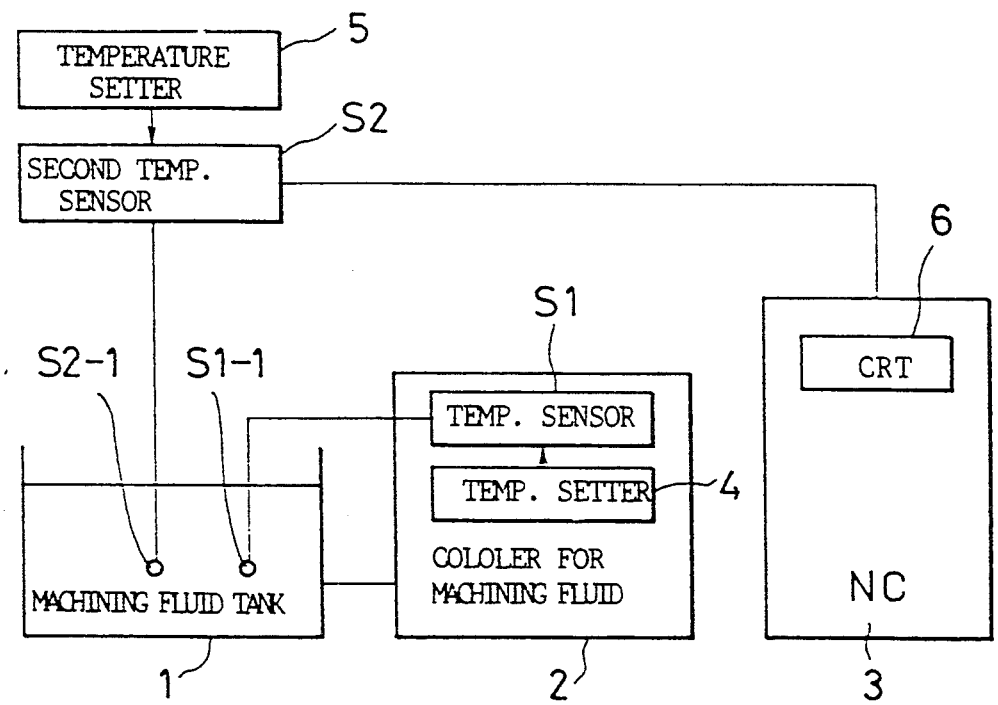
FIG. 1 is a schematic view showing the principal part of a wire-cut electrical discharge machine furnished with a machining fluid temperature deviation alarm device according to one embodiment of the present invention.

In FIG. 1, a wire-cut electrical discharge machine, furnished with a machining fluid temperature deviation alarm device according to one embodiment of the present invention, comprises a machining fluid tank 1 for storing a machining fluid, a machining fluid temperature adjuster formed of, for example, a cooler 2 communicating with the machining fluid tank 1 and adapted to cool the machining fluid, and a numerical control device 3 including a display unit formed of, for example, a CRT display unit 6, and used to control the operation of various parts of the electrical discharge machine. The machining fluid tank 1 and the cooler 2 are arranged in a conventional machining fluid circulating system (not shown) attached to the electrical discharge machine.

The electrical discharge machine further comprises first and second temperature sensors S1 and S2, which include first and second probes S1-1 and S2-1, respectively, for machining fluid temperature detection located at a predetermined height position in the machining fluid tank 1. The first temperature sensor S1 is disposed in the cooler 2, along with a first temperature setter 4 for setting the allowable range of the machining fluid temperature, and is connected to the first temperature setter 4 and a control unit (not shown) for controlling the operation of the cooler 2 in response to the output of the sensor S1. The first temperature sensor S1 serves to determine whether the actual value of the machining fluid temperature detected by means of the probe S1-1 is within the allowable temperature range, and delivers an output signal indicative of the result of the determination to the control unit of the cooler 2.

Further, the second temperature sensor S2, which is connected to the numerical control device 3 and a second temperature setter 5 for setting a predetermined temperature range covering the aforesaid allowable temperature range, serves to determine whether the actual value of the machining fluid temperature detected by means of the probe S2-1 is within the allowable temperature range, and deliver an output signal indicative of the result of the determination to the numerical control device 3. These elements 3, 5, 6, S2 and S2-1 constitute the machining fluid temperature deviation alarm device.

Figure 2:
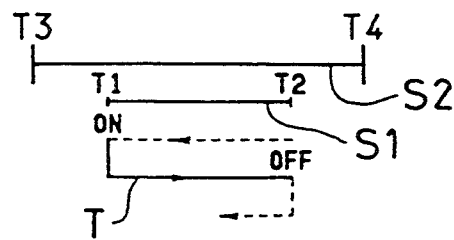
FIG. 2 is a diagram for illustrating the operation of the alarm device of FIG. 1.

Referring now to FIG. 2, the operation of the electrical discharge machine with the machining fluid off-temperature alarm device of the aforementioned construction will be described.

Before the start of the operation of the electrical discharge machine, an operator sets an allowable upper limit value T1 and an allowable lower limit value T2, which define the allowable range of the machining fluid temperature T, in the first temperature setter 4. Also, an upper limit value T3 greater than the value T1 by a first predetermined value and a lower limit value T4 smaller than the value T2 by a second predetermined value are set in the second temperature setter 5 (T4<T2<T-1<T3). Namely, a predetermined temperature range defined by the values T3 and T4 and covering the allowable temperature range is set in the second temperature setter 5. The first and second predetermined values associated with the setting of the values T3 and T4 are determined in consideration of a normal detection delay of the first temperature sensor S1, a normal operation delay of the cooler 2, and the like.

After the start of the operation of the electrical discharge machine, the machining fluid temperature T generally rises with the lapse of time. During electrical discharge machining, the first temperature sensor S1 in normal operation compares the actual value of the machining fluid temperature T detected by means of the probe S1-1 with the values T1 and T2 set in the first temperature setter 4, and delivers a signal indicative of the result of this comparison to the control unit of the cooler 2. Thus, the output signal of the first temperature sensor S1 is on its first level when the machining fluid temperature T is within the allowable range defined by the values T1 and T2, and on its second level when the temperature T is off the allowable range. Likewise, the second temperature sensor S2 compares the actual value of the machining fluid temperature T detected by means of the probe S2-1 with the values T3 and T4 set in the second temperature setter 5, and delivers a signal indicative of the result of this comparison to the numerical control device 3. Thus, the output signal of the second temperature sensor S2 is on its first level when the machining fluid temperature T is within the predetermined range defined by the values T3 and T4, and on its second level when the temperature T is off the predetermined range.

If the machining fluid temperature T attains the allowable upper limit value T1 so that the output signal of the first temperature sensor S1 changes from the first level to the second level, while the first temperature sensor S1 and the cooler 2 are normally operating, the control unit of the cooler 2 causes the cooler 2 to start operation. As a result, the machining fluid is cooled, so that the machining fluid temperature T lowers. Thus, as long as the detection delay of the first temperature sensor S1 and the operation delay of the cooler 2 are normal, the machining fluid temperature T never exceeds the upper limit value T3 set in the second temperature setter 5. If the machining fluid temperature T attains the allowable lower limit value T2 so that the output signal of the first temperature sensor S1 changes from the second level to the first level, thereafter, the cooler control unit stops the operation of the cooler 2, so that the machining fluid temperature T rises. In consequence, the machining fluid temperature T is never lower than the lower limit value T4 set in the second temperature setter 5. Thus, when the first temperature sensor S1 and the cooler 2 are in normal operation, the cooler operation is on-off controlled in response to the output signal of the sensor, so that the machining fluid temperature T is controlled within the allowable range.

In case of abnormal operation of the first temperature sensor S1 or the cooler 2, attributable to some trouble in the first temperature sensor S1 or the cooler 2 or a failure to connect the cooler 2 to the power supply, the operation of the cooler 2 sometimes cannot be started even when the machining fluid temperature T exceeds the allowable upper limit value T1, or the cooler operation sometimes cannot be stopped even when the temperature T is lower than the allowable lower limit value T.

If the machining fluid temperature T exceeds the predetermined upper limit value T3 greater than the allowable upper limit value T1, due to such an abnormal situation, the output signal of the second temperature sensor S2 changes from the first level to the second level. Namely, an alarm signal is delivered from the sensor S2. In response to this alarm signal, the numerical control device 3 causes the CRT display unit 6 to display a message to the effect that the machining fluid temperature is off. Preferably, the numerical control device 3 stops the operation of the electrical discharge machine the moment the message is displayed. Likewise, if the machining fluid temperature T becomes lower than the predetermined lower limit value T4 smaller than the allowable lower limit value T2, due to the abnormal situation, an alarm signal is delivered from the second temperature sensor S2, so that an offstate message is displayed, and the operation of the electrical discharge machine is stopped.

The present invention is not limited to the embodiment described above, and various modifications may be effected therein.

In the above embodiment, for example, the offstate message is displayed on the display unit 6 controlled by the numerical control device 3 which operates in response to the alarm signal from the second temperature sensor S2 when the machining fluid temperature has deviated beyond the allowable limits. Alternatively, however, the alarm signal may be supplied to a lamp or buzzer after being amplified, without being supplied to the numerical control device, so that an alarm is given by means of the lamp or buzzer.

In the embodiment described above, moreover, the cooler 2 is used as the machining fluid temperature adjuster. When the electrical discharge machine is operated at a low open-air temperature, however, a heater may be used as the machining fluid temperature adjuster. In this case, the heater is turned on when the machining fluid temperature T attains the allowable lower limit value T2, and is turned off when the allowable upper limit value T1 is attained. If necessary, the electrical discharge machine may be provided with both the cooler and the heater so that either of them can be alternatively used.

Although the present invention is applied to the wire-cut electrical discharge machine in the above embodiment, furthermore, it may be also applied to electrical discharge machines of any other types.

I claim:

1. In an electrical discharge machining device in which a machining fluid temperature adjuster is controlled so that a monitored machining fluid temperature is within an allowable temperature range, in response to an output signal of a temperature sensor indicative of whether the machining fluid temperature is within said allowable temperature range, a machining fluid temperature deviation alarm device, comprising:

a setter for setting a predetermined temperature range encompassing said allowable temperature range;

a second temperature sensor provided independently of said temperature sensor and adapted to monitor said machining fluid temperature, determine whether said monitored machining fluid temperature is within said predetermined temperature range, and deliver a signal indicative of the result of said determination; and alarm means for giving an alarm in response to the output signal of said second temperature sensor, indicative of a deviation of said monitored machining fluid temperature from said predetermined temperature range.

2. A machining fluid temperature deviation alarm device according to claim 1, further comprising halt means for stopping the operation of said electrical discharge machining device in response to said output signal of said second temperature sensor, indicative of the deviation of said monitored machining fluid temperature from said predetermined temperature range.

3. A machining fluid temperature deviation alarm device according to claim 1, wherein said machining fluid temperature deviation alarm device is attached to a wire-cut electrical discharge machining device as said electrical discharge machine.

* * * * *